June 2, 1964 G. F. GRONDIN ETAL 3,135,947

VARIABLE BIT-RATE CONVERTER

Filed June 15, 1960 6 Sheets-Sheet 1

INVENTORS
GEORGE F. GRONDIN
ROBERT L. McGHIE
BY
Moody and Goldman
ATTORNEYS

VARIABLE BIT-RATE CONVERTER

Filed June 15, 1960

6 Sheets-Sheet 2

INVENTORS
GEORGE F. GRONDIN
ROBERT L. McGHIE
BY Moody and Goldman
ATTORNEYS

INVENTORS
GEORGE F. GRONDIN
ROBERT L. McGHIE
BY
Mooly and Goldman
ATTORNEYS

INVENTORS
GEORGE F. GRONDIN
ROBERT L. McGHIE
BY Moody and Goldman
ATTORNEYS

INVENTORS
GEORGE F. GRONDIN
ROBERT L. McGHIE
BY
Moody and Goldman
ATTORNEYS

INVENTORS
GEORGE F. GRONDIN
ROBERT L. McGHIE
BY
Moody and Goldman
ATTORNEYS

United States Patent Office 3,135,947

Patented June 2, 1964

3,135,947

VARIABLE BIT-RATE CONVERTER

George F. Grondin, Tustin, and Robert L. McGhie, Pacoima, Calif., assignors to Collins Radio Company, Cedar Rapids, Iowa, a corporation of Iowa Filed June 15, 1960, Ser. No. 36,221
7 Claims. (Cl. 340—172.5)

This invention relates to devices for changing the bit-rate of digital data. In particular, the invention is capable of changing the bit-rate of data by a large amount and of synchronizing it to an independent timing source.

A problem solved by this invention occurs when a bit-synchronous data communication system is available, but data supplied to it for transmission has a bit-rate that may be anywhere from a much slower rate to nominally the same rate as the communication system.

An advantage of using a bit-synchronous data communication system is that it enables lower error rates than a nonsynchronous system. One type of bit-synchronous data communication system is described and claimed in Patent No. 2,905,812 to Melvin L. Doelz and Dean F. Babcock. Such system can multiplex many channels simultaneously in a very narrow bandwidth; and for example, it can transmit forty channels of 100 words per minute teletypewriter data over a single voice-quality telephone line. A characteristic of a bit-synchronous multiplex system is that all channels must have the same bit-rate.

Many present teletypewriter facilities have large amounts of equipment on hand which have differing slow rates, such as 60, 75 and 100 words per minute. The outputs of such teletypewriters cannot be directly connected into a faster rate system, such as one having all channels with a bit-rate corresponding to 100 words per minute. Presently-available data synchronizers cannot translate data to a bit-rate that differs by more than about 10% from the input bit rate. Data rate converters capable of translating nonsynchronous data into synchronism with a transmission clock rate of nominally the same rate (although an actual rate difference of up to about 10% may exist) is described and claimed in U.S. Patent No. 2,833,858 and U.S. Patent application No. 842,299, filed September 25, 1959, both invented by George F. Grondin. The present invention can perform the function of these prior inventions without having their rate limitations.

This invention provides an adjustable bit-rate translator which can be connected between slow-rate teletypewriters and a much higher-rate communication system to permit synchronous transmission of data. Although the invention can translate the bit-rate to a high value, it does not translate the character rate of the data, which remains at its original value of, for example, 60, 75, or 100 words per minute.

After the high-rate communication is received, existing teletypewriters or other data handling equipments at the receiving terminal may likewise be too slow to directly handle the incoming data, even though the character rate of the received data is compatible with receiving terminal equipment. This invention provides bit-rate reduction, so that incoming data received at a high bit-rate can be reduced to bit-rates compatible with existing low-rate equipments. This invention is the first to perform this unique inverse function so far as is presently known.

The teletypewriter example is given as a single practical illustration. Other uses of the invention will be obvious, such as changing the bit-rate of blocks of data derived from computers or from any other digital data source.

Accordingly, this invention provides a device which eliminates the need for replacing existing slow-rate data handling equipment when a high-rate communication system is installed. The replacement of low-rate terminal equipment may cost many times more than the high-rate communication system. Hence, the installation of high-rate bit-synchronous communication systems is made more feasible by this invention under many existing economic circumstances.

It is, therefore, an object of this invention to permit the translation of data bit-rates over a large range.

It is another object of this invention to provide a bit-rate changer that is adaptable without modification to change bit-rates over a large range by a simple adjustment.

It is still another object of this invention to permit digital data to be synchronized with a clock-pulse source of different rate than the input bit-rate of the data.

It is a further object of this invention to provide a data-rate changer that can increase the bit-rate to any required amount almost without limit, or that can reduce the bit-rate to a required low rate under certain circumstances.

It is a still further object of this invention to permit the installation of a high-quality high-rate data communication system between data-handling terminals having low bit-rate equipments, without causing obsolescence of the low-rate equipments, thereby avoiding their replacement expenses.

It is another object of this invention to provide a data-rate changer that is compatible with and can replace existing data rate converters operating at fixed nominal rates to synchronize data having input rate variations of 10% or less.

It is still another object of this invention to provide a data-rate changer that does not have any mechanically moving parts.

The invention comprises a plurality of shift registers which are operated sequentially to store each input character (or word sequence of a data block). The total shift-register storage is sufficient to store the information bits in an input character (or block word sequence), with the information-bits being divided among the shift registers. The input data is sequenced to the shift registers by a load counter operated by a pulse timing source correlated with the bits of an input character. Thus, a first shift register loads during certain counts, a second shift register loads during other counts, a third shift register loads during further counts, etc., until an input character (or word sequence) is entirely stored.

An unloading sequence for the shift registers is triggered by a particular count of the load counter, and it must be either the last count that loads the first shift register to receive data of a character (or block) or it can be any later load count of a sequence. The unload bit-rate range is dependent upon the choice of the particular load count that triggers the unloading operation.

Other objects, features and advantages of the invention will become apparent to one skilled in the art upon further study of the following specification and accompanying drawings, in which.

Figure 1:
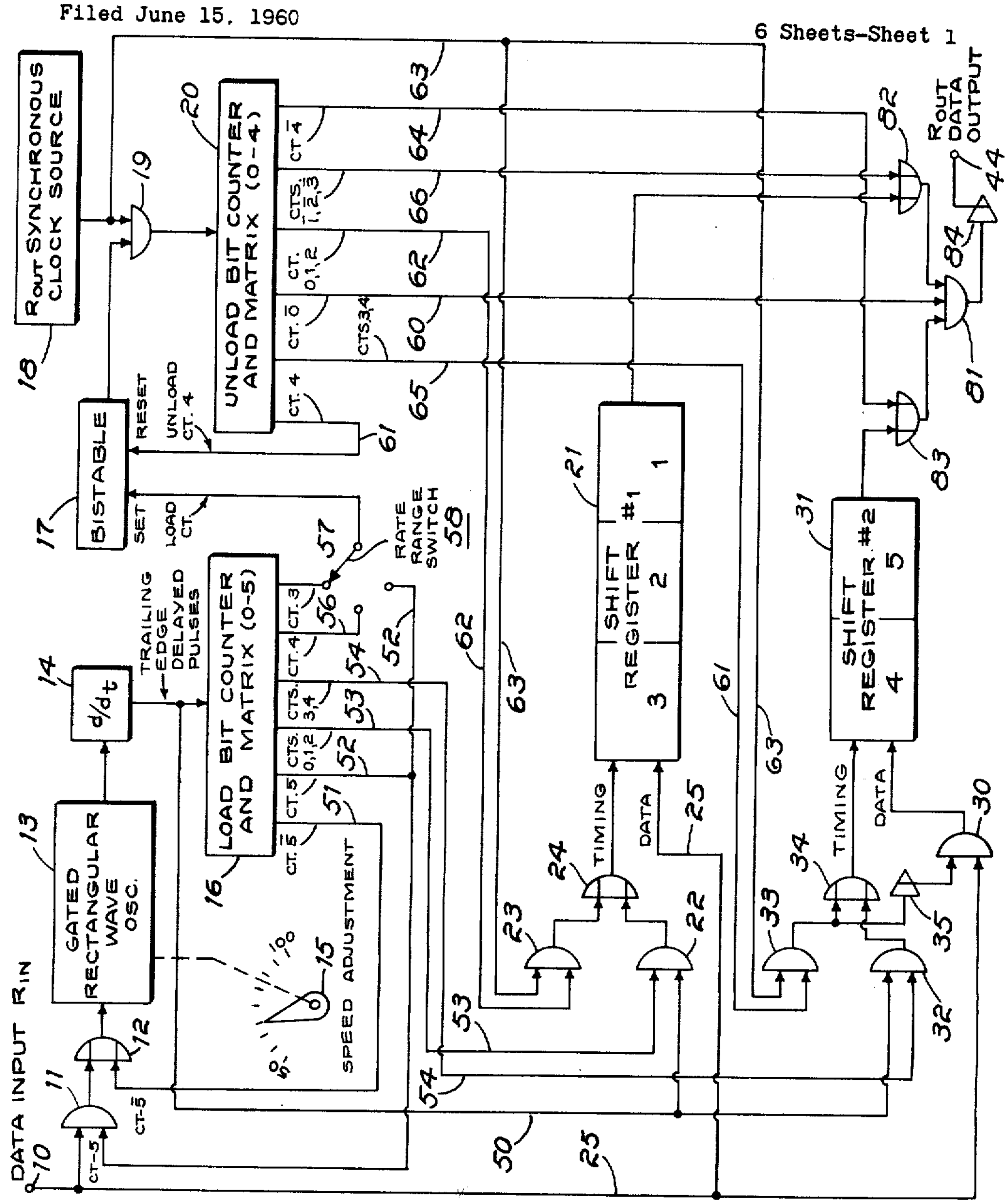
FIGURE 1 illustrates a variable bit-rate converter for use at a transmitting terminal.
Figure 2:
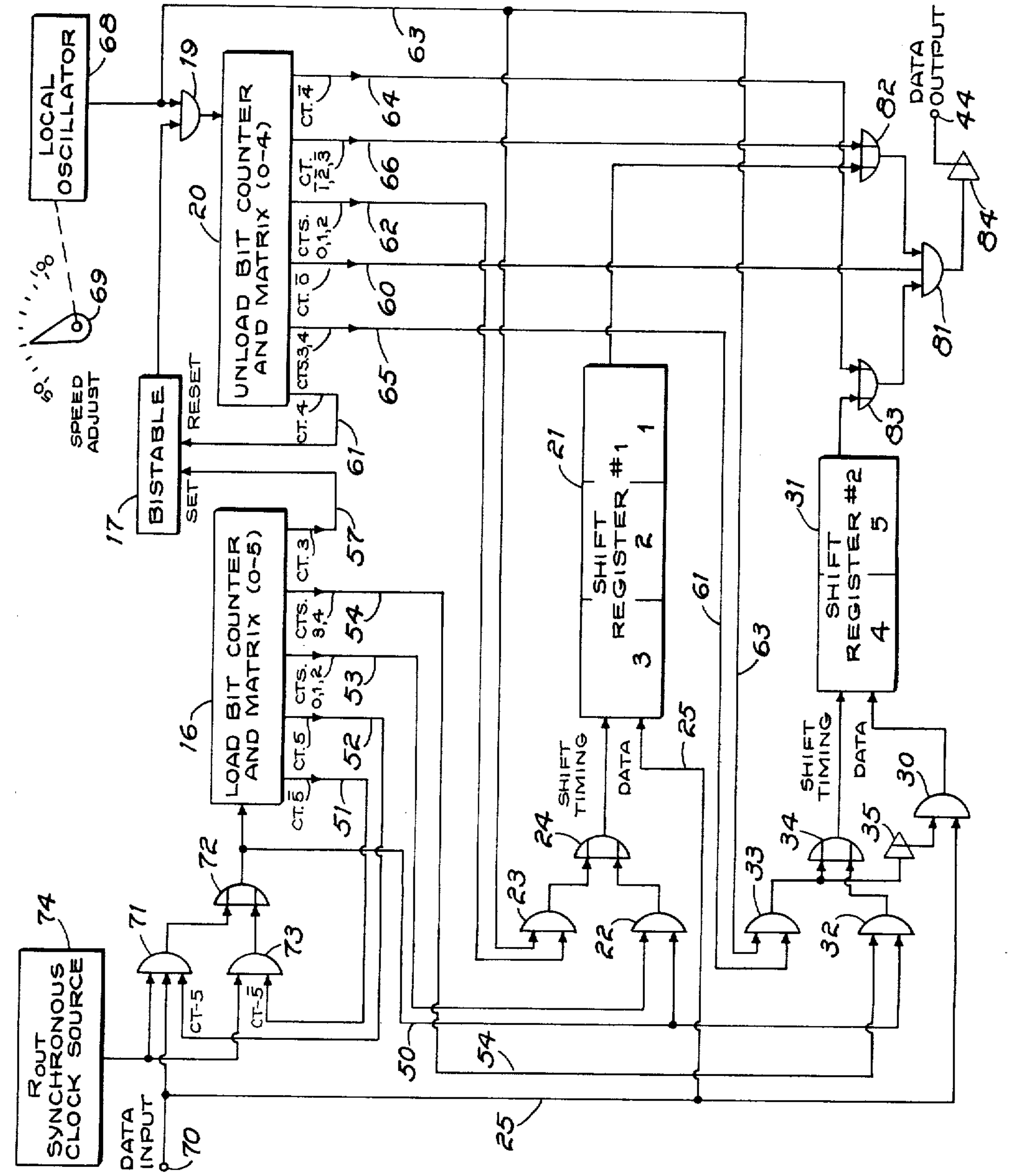
FIGURE 2 illustrates a variable bit-rate converter for use at a receiving terminal.
Figure 4:
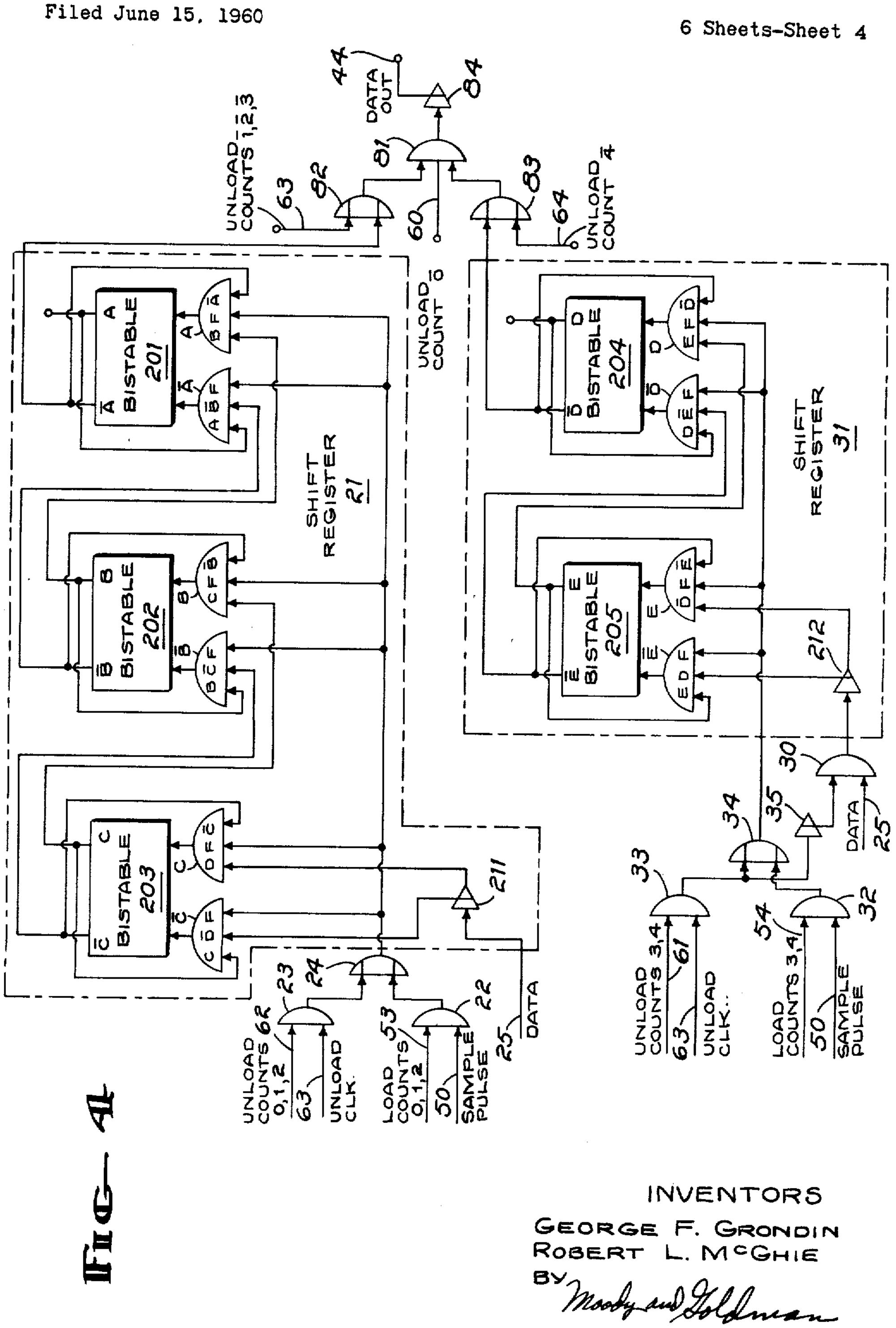

FIGURES 3(A)–(E) provide wave-forms used in explaining the operation of input circuitry of FIGURE 1;

FIGURE 4 shows a more detailed arrangement for shift registers which can be used in the embodiments of FIGURES 1 and 2;

FIGURES 5(A)–(J) diagrammatically represent transmitting timing conditions for the invention; and, FIGURES 6(A)–(F) diagrammatically represent receiving timing conditions for the invention.

The embodiments of the invention shown in the drawings will now be explained.

FIGURE 1 illustrates a particular form of the invention which may be used at a transmitting terminal. It has an input terminal 10, which receives data provided according to a particular binary-character code, and at an average bit-rate $R_{in}$. The bit-rate is increased by the system of FIGURE 1 to a higher output bit-rate $R_{out}$, which can be arbitrary with respect to the input rate. Hence, no harmonic relationship is necessary between input and output rates, although it can be provided without difficulty in the invention.

The "average" input bit rate $R_{in}$ recognizes that different bits of an input character may have different time lengths, such as the nonsynchronous stop pulses in the standard teletypewriter character code. However, in FIGURE 1, the output rate $R_{out}$ is periodic; that is, all of its bit periods have the same length.

Although the invention in FIGURE 1 alters the bit-rate $R_{in}$, it does not alter the character rate, which is the same at an output terminal 44 as at the input terminal 10. The increased output bit-rate causes the characters to occupy less time, with a time gap resulting between characters.

The embodiments in this specification presume the use of standard teletypewriter coding for input data. The standard teletypewriter code utilizes a character having seven bit periods; wherein the first and last are start and stop bits defining the boundaries of a character. The stop bit has approximately 1.4 of the time length of any other bit of the character. Five information bits are provided between the start and stop bits of a character. The information bits are pulse coded in binary form between two amplitude levels which may be identified as 1 and 0, or "mark" and "space," to provide up to $2^5$ different characters representing the standard teletypewriter keyboard. The "start" and "stop" bits have levels of "mark" and "space" respectively. Thus, each character is introduced by a switching from "space" to "mark" states, i.e. 0 to 1 states, and this condition is used in FIGURE 1 to recognize the start of a character.

The initial part of FIGURE 1 generates sampling pulses which are approximately centered with respect to the bits of each input character, except for its "stop" pulse. The sampling pulses are provided by differentiating the output of a gated rectangular-wave oscillator 13.

Oscillator 13 may be a free-running multivibrator which has a disabling bias normally applied from gate 12 that prevents oscillation. An input to gate 12 removes the disabling bias so that the oscillator is gated "on." Its oscillatory period is adjusted by a knob 15 to very nearly equal the bit periods for the start and information bits of received characters. The stop-bit length is ignored in this respect. Accordingly, knob 15 controls the free-running rate of oscillator 13, and it is positioned along a scale representing the word-per-minute rate of incoming data. For example, at the sixty words per minute position, it free-runs at a rate of about 45 cycles per second. Knob 15 may therefore be connected to either the resistor or the capacitor components within a multivibrator to control its free-running state. The wave-form of oscillator 13 is presumed to have a symmetrical square-wave form.

The oscillator is gated "on" when a character "start" bit is received. The gating operation is assisted by an "and" gate 11, which has an input connected to terminal 10.

Another input of gate 11 is connected to an output lead 52 of a load bit counter and matrix 16. Counter 16 has six counts identified as 0–5, which are intended to correspond with the first six bits of a character. The 5th count occurs during the last information bit and exists through the stop bit of a received character. Thus, gate 11 is enabled by count 5 prior to each received character.

When the start pulse of a new character appears, it passes through gate 11 and through an "or" gate 12 to the input of gated oscillator 13, and causes it to oscillate at its free-running rate. The oscillation is permitted to exist only during the first six bits of each received character to provide six output pulses from a differentiator circuit 14 corresponding to the trailing edges of oscillator pulses. The count $-\bar{5}$ output on lead 51 passes through "or" gate 12 to maintain the oscillation through the six counts of counter 16.

Figure 3:
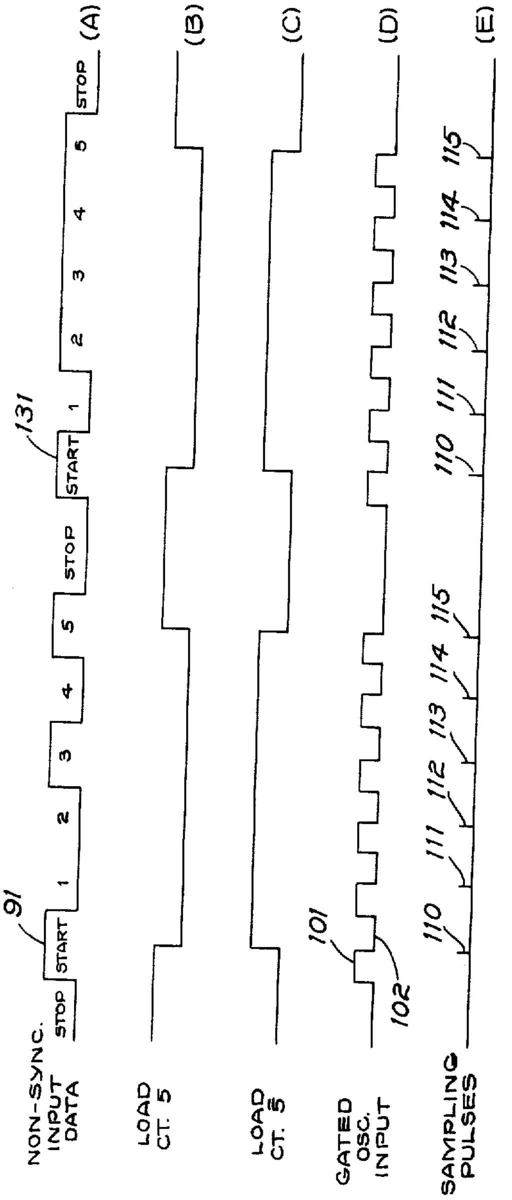

FIGURES 3(A)–(E) are now considered for a waveform explanation of the operation of oscillator 13. The high-level of the wave-forms is presumed to be enabling, and the low level to be disabling, where a wave is provided as an input to an "and" gate. If the enabling input of load count 5 is initially provided to "and" gate 11 as shown in FIGURE 3(B), gate 11 can pass a start pulse 91 of a received character. The high level of the start pulse enables oscillator 13 and begins an oscillator sequence, beginning with a positive-going half-cycle 101 in FIGURE 3(D) followed by a negative-going half-cycle 102, etc.

Differentiator 14 in FIGURE 1 receives the oscillator output and provides output pulses corresponding to the negative-going trailing edges of the oscillator wave. The resulting sampling pulses 110–115 from differentiator 14 are illustrated in FIGURE 3(E). By having oscillator 13 provide a symmetrical wave-form and by adjusting its free-running period to equal the length of the start bit, sampling pulses 110–115 align centrally with respect to the start bit 91, and the following five information bits. By having the sampling pulses positioned centrally with respect to input data bits, the sampling function is optimized in most situations where the bits have their most reliable levels located centrally. Difficulties with various types of distortions can be alleviated by making the oscillator cycle somewhat asymmetrical, so that the sampling pulses can be positioned at the best portion of input data bits.

Input-bit counter and matrix 16 counts the input bits of each received character. Its counts from 0 through 5 respectively correspond to the start through the last information bit of a received character, and the count 5 state continues through the stop bit. Upon initial reset as well as at the end of each received character, counter 16 is left at output count 5 to enable input gate 11 for reception of the next character. When a character start bit is received to cause a first sampling pulse 110, counter 16 is triggered to count 0. Accordingly, gate 11 is no longer enabled since count 5 has terminated; and it blocks further passage of the start bit and following bits to oscillator 13. However, oscillator 13 continues to oscillate because an enabling input is now supplied to it through "or" gate 12 by output lead 51 of counter 16, which enables on all counts but count 5, i.e. count $\bar{5}$. Count $\bar{5}$ waveform is shown in FIGURE 3(C), wherein the high-level state is presumed to be enabling. For these reasons, oscillator 13 continues its oscillation until a total of six counts are provided, wherein the last count 5 terminates the gating input to oscillator 13 by ending enabling input count $\bar{5}$. And when the next character start pulse 131 is received, a new sampling pulse sequence from differentiator 14 is provided and its pulses are likewise positioned centrally with respect to the new start pulse and following information pulses as shown in FIGURE 3(A), etc.

In FIGURE 1, a pair of shift registers 21 and 31 store the information-bits of each input character, which is loaded into the registers under timing commands of sampling pulses 110–115 as sequenced by outputs of load counter 16. Shift register 21 has a three-bit storage length, and shift register 31 has a two-bit storage length. Accordingly, there is a total storage of five bits in the two shift registers, which store the five information bits of an input character. The operation of the invention makes unnecessary the storage of the start and stop bits.

Both shift registers 21 and 31 have inputs provided by a lead 25 to receive data from input terminal 10. However, information is only storable in a shift register (of the type shown) when a sequenced-timing pulse is simultaneously applied from the output of an "or" gate 24 or 34, respectively.

Shift register 21 has load timing pulses sequenced to it by an "and" gate 22 during the first three information data bits provided by any character. Gate 22 has one input connected to a lead 50 to receive sampling pulses and has another input connected to counter output lead 53, which provides an enabling input to gate 22 during counts 0, 1 and 2 of counter 16. Thus, sampling pulses 111, 112 and 113, which occur during the first three information bits, pass through gates 22 and 24 and cause the data of the first three information bits to be shifted into and stored within shift register 21.

The fourth and fifth information bits are shifted into and stored by shift register 31, because of "and" gate 32, which has inputs connected to lead 50 to receive sampling pulses and to counter lead 54, which provides an enabling input to gate 32 during counts 3 and 4 of load counter 16. Accordingly, pulses 114 and 115 in FIGURE 3(E) are passed by gates 32 and 34 to the shift register, so that it can receive and store the fourth and fifth data bits of the character, which are passed through an "and" gate 30 that is enabled by the output of an inverter 35 during load counts 4 and 5.

Pulse 115 also triggers the load counter to output count 5 which disables oscillator 13 until the next character start pulse is provided.

The next requirement in the invention is that the character stored in the shift registers be unloaded at output terminal 44 in synchronism with a required output timing, and with appropriate start and stop bits inserted.

A synchronous clock source 18 provides the timing which determines the output bit rate $R_{out}$ of the system. An unload counter and matrix 20 controls the sequencing of bits to be unloaded from shift registers 21 and 31 in synchronism with timing pulses of clock source 18.

The operation of unload counter 20 is started indirectly by a particular count of load counter 16. That count may be 3, 4, or 5, depending upon a range required for the output-input bit-rate ratio ($R_{out}/R_{in}$). A rate-range switch 58 is provided having three stator contacts connected to leads 52, 56 or 57 that respectively receive load counts 5, 4 and 3. When switch 58 is set at load count 3, the input rate can be varied from about one-half the output rate up to approximately the output rate. This, for example, is sufficient to connect teletypewriters operating at 60 or 75 words per minute into a synchronous system having a bit-rate corresponding to 100 words per minute.

On the other hand, when switch 58 is set for load count 4, the output rate may vary from about 1.15 to 4 times the input rate. And when switch 58 is set for load count 5, the output rate of the system may be any amount greater than about 1.33 times the input rate, except in so far as the reaction time required for component portions of the system may cause limitation. However, such reaction times are generally negligible compared to ordinary data rates at the present state of the art.

A bistable 17 operates to transmit the unload command from load counter 16 to unload counter 20. Bistable 17 has a set input connected to switch 58. It is set by the load count selected by the setting of switch 58. When bistable 17 is set, its output provides an enabling input to an "and" gate 19; which has another input receiving synchronous pulses from clock 18. Accordingly, when bistable 17 is set in response to a chosen load count, synchronous pulses reach the input to unload counter 20, and it begins to sequence.

Bit unload counter and matrix 20 has five output counts designated as 0–4. When reset or after having completed an unloading cycle, counter 20 is at output count 4.

When counter 20 completes a sequence of five counts, its output count 4 resets bistable 17 to block "and" gate 19 and end the sequence. Any further clock pulses are therefore blocked until the next character is received to cause bistable 17 to again be set.

When load count 3, 4 or 5 sets bistable 17, the first clock pulse passed by gate 19 triggers counter 20 to output count 0. Unload count 0 causes a "start" bit to be generated at output terminal 44 by disabling an "and" gate 81, which has its disabled output inverted by an inverter 84 to appear as a "mark" level representing a start bit at output terminal 44.

The second, third, and fourth clock pulses of a sequence are passed through an "and" gate 23 and an "or" gate 24 to shift out the three stored bits in shift register 21. Thus, gate 23 has an input connected to lead 62 so that it is enabled during output counts 0, 1 and 2 of counter 20 and to lead 63 to receive the clock pulses. When shifted out of register 21, the data passes through gates 82 and 81 and inverter 84 to the output terminal 44. "And" gate 81 has its other two inputs enabled during counts 1, 2, and 3. Thus, lead 64 provides it with an enabling input from "or" gate 83 on counts 0, 1, 2, and 3, which represent all but count 4, i.e. count $\overline{4}$. The other input to gate 81 provided by lead 60 is enabling on counts 1, 2, 3 and 4, which is all counts but count 0, i.e. count $\overline{0}$. Hence, "or" gate 82 is free to pass the binary data from shift register 21 during unload counts 1, 2 and 3; because no input is provided to the other "or" gate input during these counts; that is, lead 66 provides output counts $\overline{1}$, $\overline{2}$, and 3.

The 4th and 5th pulses of a sequence triggering unload counter 20 shift the two stored bits out of register 31. This is done with an "and" gate 33 that receives clock pulses from lead 63 and receives an enabling input from lead 65 during unload output counts 3 and 4. The two unloading pulses from gate 33 pass through "or" gate 34 to cause the two bits of data of register 31 to be shifted to output terminal 44 via gates 83, 81 and inverter 84. At unload count 4, "or" gate 83 is not blocked since its input lead receives count —$\overline{4}$. It therefore passes the data through it. Enabling inputs are provided to the other inputs of "and" gate 81, since leads 60 and 66 provide enabling signals at unload count 4. Inverter 84 inverts the received data so that the output data has the same polarity as the input data, because of an inverted polarity choice from the output of the shift registers.

During the shifting out of data from register 31, its data input is blocked by a "0" being provided from "and" gate 30 by inverting the unloading timing pulses from the output of gate 33 to disable gate 30. The output state of register 31 after the fifth bit is read out as a "1" at output $\overline{D}$, which registers "0" that represents the "stop" bit level at output terminal 44.

Figure 5:
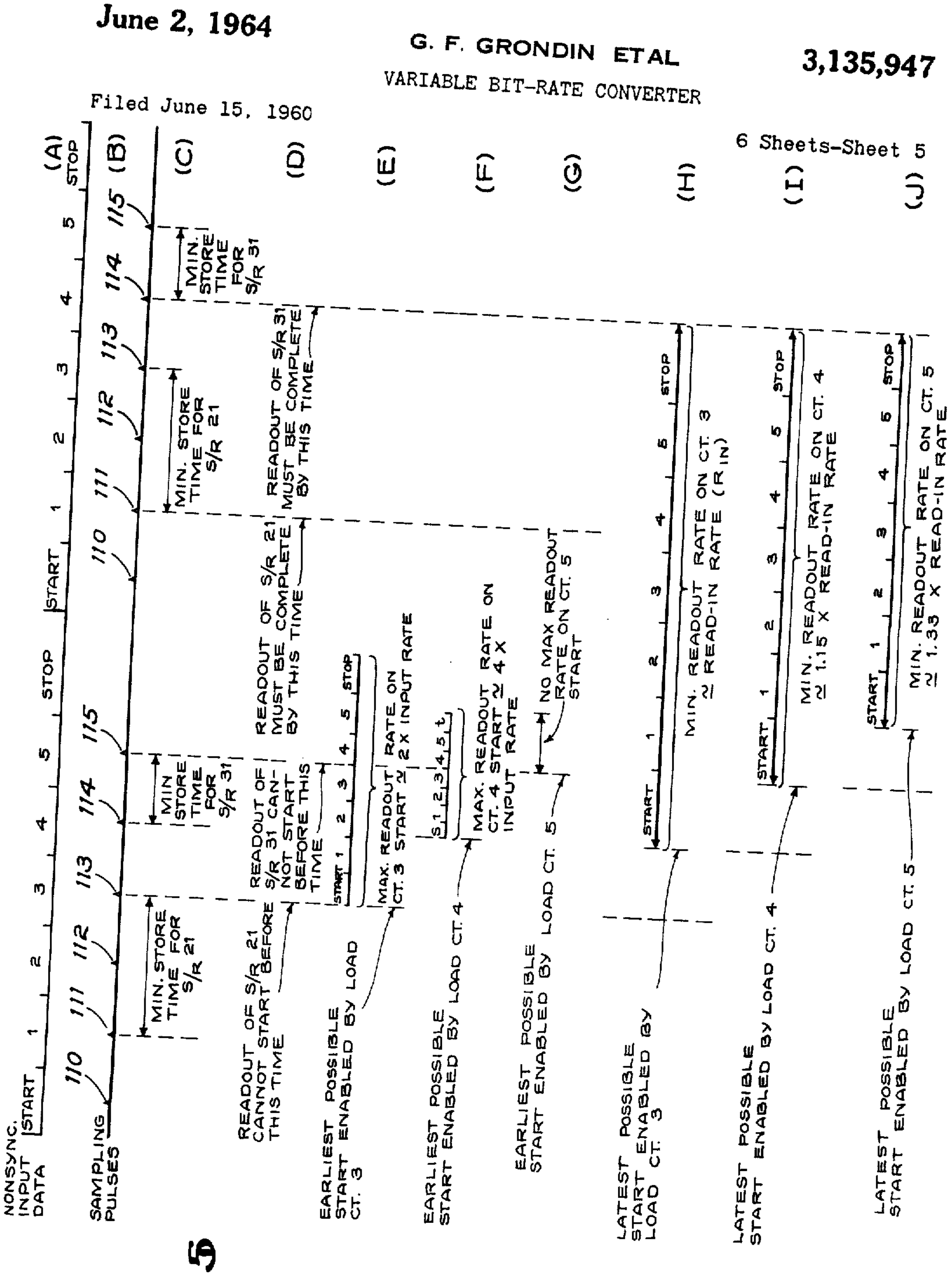
Figure 6:
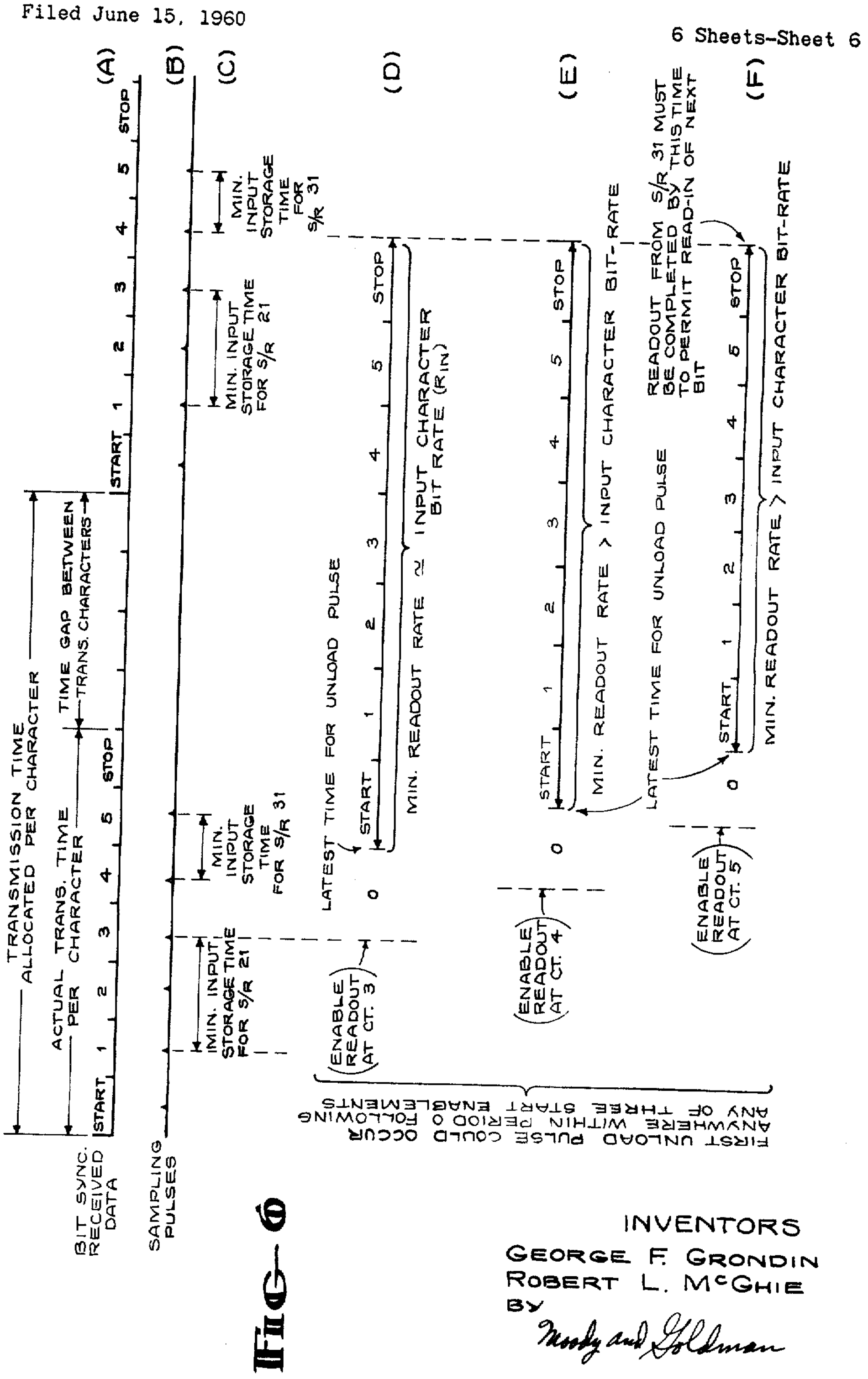

FIGURES 5(A)–(J) illustrate the limiting conditions upon transmit timing for the embodiment in FIGURE 1. FIGURE 5(A) represents the timing of input data, while FIGURE 5(B) represents sampling pulses of the same type shown in FIGURE 3(E).

FIGURE 5(C) represents minimum read-in time conditions for the shift registers. Since three sampling pulses 111, 112, and 113 are required to read in the data to shift register 21, the minimum time is from slightly before pulse 111 to slightly after pulse 113, or about two sampling pulse periods. Likewise, sampling pulses 114 and 115 read in data to shift register 31; and the minimum time for this is from slightly before pulse 114 to slightly after pulse 115, or approximately one sampling pulse period.

FIGURE 5(D) indicates the readout maximum time limits for the shift registers. It is basic that a shift register cannot have read-in and readout operations done simultaneously, without added complexities. Therefore shift register 21 cannot start a readout cycle until after its last sampling pulse 113 and must complete its readout cycle by the first sampling pulse 111 of the next sequence. Likewise shift register 31 cannot start a readout cycle until after sampling pulse 115 and must have completed the readout cycle by sampling pulse 114 of the next sequence. In general, the conditions of FIGURE 5(D) control the minimum readout rate of the embodiment in FIGURE 1.

FIGURES 5(H), (I) and (J) represent minimum readout rate conditions as a function of readout enablement, by load counts 3, 4, or 5, respectively. It can be seen that the minimum readout rate (corresponding to the longest readout period) is obtainable when the unload sequence is enabled by load count 3 as shown in FIGURE 5(H). Load count 3 is triggered by sampling pulse 113. No load count before count 3 can be used because shift register 21 would then be required to read out at the same time it is receiving data. Whenever the readout sequence is enabled by load count 3 or greater, the unloading operation does not necessarily begin immediately, since the sampling pulses are not synchronized with the clock pulses. Thus, a maximum-length readout sequence cannot start until the first clock pulse after the occurrence of the enabling load count, which can be at any time within one clock pulse period after the enabling sampling pulse. The latest starting time controls the minimum assurable rate; and in each of FIGURES 5(H), (I) and (J) this is approximately one clock-pulse period after the enabling sampling load count begins.

The completion of a maximum-time readout sequence in any of FIGURES 5(H), (I), or (J), including start and stop pulses, must be accomplished by the next count 3, as indicated in FIGURE 5(D). Hence, the slowest possible readout rate is defined by FIGURE 5(H), where readout is triggered by load count 3; and it is approximately equal to the read-in rate because it is very nearly bounded by two consecutive sampling pulses 114.

In FIGURE 5(I), where load count 4 is used to enable the readout operation, the minimum readout rate is approximately 1.15 multiplied by the read-in rate.

In FIGURE 5(J) where load count 5 enables the readout operation, the minimum readout rate is approximately 1.33×readout rate.

A different set of conditions controls the maximum readout rate as a function of the enabling load count; and maximum rate conditions are represented by FIGURES 5(E), (F), and (G). The maximum assured rate depends upon the earliest time that a clock pulse can occur after an enabling load count; and this is at the occurrence of the enabling load count.

FIGURE 5(E) illustrates how the maximum readout rate is determined when load count 3 enables the output sequence. The controlling factor is that the readout of the third bit should not be completed until the second shift register is ready for readout, which is not until after sampling pulse 115. Consequently, the start pulse and first three information bits of a readout character must not occur in less than two sampling pulse periods. This determines a maximum rate of about twice the input rate when the readout is enabled by load count 3.

FIGURE 5(F) illustrates the determination of the maximum rate when load count 4 enables the readout. Here, only one sampling pulse period is allowed as the minimum period during which the first four bits of a character may be readout without breaking continuity with the last two information bits. This permits a maximum readout rate of approximately four times the input rate.

When the load count 5 is used to enable the readout, there is no maximum limit because after the fifth count, both shift registers have completed their loading operations. Accordingly, they are free to unload as fast as required.

It can therefore be realized that the system in FIGURE 1 can increase almost without limit the bit rate of data and synchronize it with a clock pulse source. Thus, it can make low-rate nonsynchronous input data compatible with a communication system that is designed to handle much faster bit rates in synchronism with an internal clock of the communication system. However, though the bit-rate has been increased, the character rate is the same at output terminal 44 of the synchronizer in FIGURE 1 as it was at its input terminal 10. Consequently, the time per character will be decreased at the output in FIGURE 1; and there will exist a gap period between characters not having any data. The gap time between transmitted characters is in effect an elongation of the stop bit terminating a character. FIGURE 6(A) illustrates an example of characters transmitted from terminal 44. FIGURE 6(A) also is representative of the characters received by a receiving terminal, since the time sequence is presumed not to be altered during transmission.

In FIGURE 6(A), the transmission time allocated per character is the time between starts of received characters; and it is very nearly the time between starts of the characters at terminal 10 in FIGURE 1. However, the characters at terminal 10 are presumed to occupy the entire allocated time. The actual transmission time per character is therefore smaller than the allocated time per character.

Often the bit rates of data handling equipments at a receiving terminal are too slow to directly operate from a received signal. The embodiment of FIGURE 2 provides a bit-rate translator for a receiving terminal, which can obtain a reduction in the bit rate of a received signal. The system in FIGURE 6, in effect, stretches the received characters so that they can occupy part of the gap time following each received character. Accordingly, the receiving system of FIGURE 2 permits a reduction in bit-rate back to approximately the bit-rates provided at input terminal 10 to the synchronizer in FIGURE 1. Furthermore, the system of FIGURE 2 can also reduce the bit rate to a different rate than originally provided; for example, data transmitted from a 60 word per minute teletypewriter over a 100 word per minute communication system can be reduced at the receiving terminal to a 60 or 75 word per minute bit-rate for transcription by a machine of either rate.

The receiving system rate converter of FIGURE 2 is basically the same as the transmitting system rate converter in FIGURE 1 in regard to all items, except for the timing pulse sources for counters 16 and 20. In effect, the timing for counters 16 and 20 is reversed in FIGURE 2. In FIGURE 2, the synchronous clock pulses are gated to the input of load counter 16, and an adjustable gated timing is provided to unload counter 20. Thus, in FIGURE 2, a clock pulse source 74 provides output pulses synchronized with the mid-portions of received data input terminal 70. The means for synchronizing clock 74 with clock 18 is not explained in detail herein, but may be accomplished by a separate transmission channel, such as a wire line or separate radio link, connecting clocks 18 and 74. On the other hand, they may be synchronized by more sophisticated means such as, for example, by the system described in U.S. Patent No. 2,914,674 to George H. Barry, titled, "Phase-Pulse Receiver Synchronization Means."

The gating of pulses from clock 74 at the input to counter 16 is accomplished as follows: When load counter 16 is at count 5, it indicates the system is ready to receive an input character; and an "and" gate 71 is enabled to pass the start bit of the next character. A pulse from clock 74 occurring near the center of a received start bit is passed through gate 71 and an "or" gate 72 to trigger counter 16 to output count 0. The synchronous pulses from source 74 are also provided to an "and" gate 73 which is enabled during all counts but 5, i.e. count $-\bar{5}$. Since the counter output is no longer 5 after the start bit, gate 73 is enabled throughout the remaining counts to permit a sequence of six clock pulses to trigger counter 16 through counts 0–5, after which it remains on count −5 until the next character is received to repeat the cycle.

The other internal operations of loading and unloading the shift registers 21 and 31 is the same in FIGURE 2 as explained in connection with FIGURE 1.

However, in FIGURE 2, an adjustable oscillator 68 provides the unloading bit-rate. Oscillator 68 is free-running and its free-running pulse rate is adjusted by a knob 69, which is calibrated over a range of bit-rates, such as those represented by word rates between 50 and 100 per minute.

In FIGURE 2, load count 3 is utilized to set bistable 17, although load counts 4 or 5 could also be used when compatible with a required rate range.

The minimum time limitations for shift registers 21 and 31 in FIGURE 2 are shown in FIGURE 6(B); and they are basically the same as those shown in FIGURE 5(C) for FIG. 1 and are derived in the same manner.

By using load count 3 to begin each unloading sequence in FIGURE 2, the minimum readout rate is permitted, and it is approximately equal to the input rate at the transmitting terminal. The minimum rate computation can be obtained from FIGURE 6(D), which finds that the minimum readout rate is approximately a rate equal to $R_{in}$ at input terminal 10 in FIGURE 1.

When load counts 4 or 5 are utilized, the minimum rate is higher than $R_{in}$, as can be seen in FIGURES 6(E) and (F). FIGURES 6(D), (E), and (F) are derived in the same manner as FIGURES 5(H), (I), and (J). Therefore, by using load count 3, maximum reduction in bit-rates is permitted.

In some cases it might be desirable to have the received data translated to a higher rate rather than a lower rate. In such cases, the maximum rate conditions given in FIGURES 5(E), (F) and (G) also apply, and the rate of oscillator 68 is adjusted accordingly to a rate faster than the rate of clock 74. Therefore, up to double the input rate is permitted by using load count 3 to enable readout; up to four times the input rate is permitted by using load count 4; and there is virtually no limit when load count 5 is used.

Many available forms of shift registers can be used in the invention. FIGURE 4 illustrates a particular form of shift register which may be used in either or both of FIGURES 1 and 2.

Shift register 21 in FIGURE 4 comprises three bistable circuits 201, 202 and 203. Likewise, shift register 31 comprises bistables 204 and 205. Each of the bistables has set and reset inputs respectively controlled by "and" gates. The gates are designated A, $\overline{A}$; B, $\overline{B}$; C, $\overline{C}$; D, $\overline{D}$; E, $\overline{E}$, and they control respective outputs of their bistable circuits carrying the same designation. The bar above a letter represents a complementary output of a bistable. For example, when all of the inputs of "and" gate $\overline{C}$ are enabled, bistable 203 provides a "1" at its output $\overline{C}$ and a "0" at its output C. The input logic combinations lettered within the respective "and" gates are Boolean algebra notations.

The data sequenced from input lead 25 is provided through a pair of inverters 211 and 212 which provide inverted data $\overline{D}$ and non-inverted data D sequenced outputs; "and" gate 30 is enabled during the data loading of shift register 31. The sequenced loading sampling pulses are represented by the notation F in FIGURE 4. The operation of the shift registers is straight forward, wherein input data triggers the first bistable 203 or 205 of the respective shift registers as data is sequenced by the load counter through the respective input gates of the first bistable of a shift register.

Note that the outputs of shift registers 21 and 31 are taken from complementary terminals $\overline{A}$ and $\overline{D}$, respectively. Accordingly, these inverted data outputs are re-inverted by final inverter 84 to provide data at output terminal 44 that has the same polarity as the corresponding input data to terminal 10.

In the sequencing of the invention, two shift registers are used with different amounts of storage. It should become obvious after studying this specification that the teachings of this invention can readily be extended to the use of any plurality of shift registers having greater or lesser storage sections than those shown in the particular embodiments; wherein the shift registers are operated sequentially in the manner of the two shift registers shown. Also it is readily apparent that simple manually-operated switches can be provided to easily switch the embodiment of FIGURE 1 to that of FIGURE 2, and vice-versa.

Although this invention has been described with respect to particular embodiments thereof, it is not to be so limited, as changes and modifications may be made therein which are within the spirit and scope of the invention as defined by the appended claims.

We claim:

1. A bit-rate converter for sequentially conveyed data words, comprising a plurality of storage means capable of receiving and storing said data, the combined capacity of said storage means being at least equal to the information bits of one data word, load counter means, variable input timing source means for providing pulses having a repetition rate substantially equal to the bit rate of the received words, means for supplying the output of said variable input timing source to said load counter means to cause said load counter means to advance one count in response to each pulse supplied thereto, a plurality of load gating means each individual to one of said plurality of storage means and constructed to respond to selected count output signals from said load counter means to load the received data bits into each of said storage means serially in the sequential order in which they are received and to load said plurality of storage means in a predetermined order, output timing source means constructed to provide output pulses for timing the output bit-rate of the converter, unload counting means constructed to respond to the output pulses from said output timing source means over a predetermined cycle of counts, means including second gating means responsive to particular count output signals of said load counter means for connecting a predetermined sequence of pulses from said output timing source means to the input of said unload counting means, a plurality of unload gating means each individual to one of said plurality of storage means and constructed to be responsive to the output of said output timing source means and preselected counts of said unload counting means to unload the individual bits stored in each of said storage means in the sequential order in which they were stored and to unload said plurality of storage means in said predetermined order, and output means including output terminal means and other gating means responsive to the output signals of said unload counting means to supply the unloaded data bits from said plurality of storage means to said output terminal means in the sequential order in which said data bits are unloaded from said plurality of storage means.

2. A bit-rate changer for sequential bit data words comprising a plurality of shift registers, the combined bit storage capacity of said plurality of shift registers being at least equal to the number of information bits in one of said words, a gated variable frequency input timing pulse source for providing output pulses having a repetition rate substantially equal to the bit rate of the received data words, load bit-counter means constructed to respond to the output pulses from said gated variable input timing source to count through a first predetermined cycle of counts, a plurality of load gating means individual to individual ones of said shift registers, each of said plurality of load gating means constructed to respond to preselected count signal outputs of said load counter means and the received data bits to load said received data bits into each of said shift registers in a serial manner and in the order in which said data bits are received, said load gating means further constructed to load said shift registers in a predetermined order in response to preselected count signal outputs from said load bit counter means, output timing source means constructed to provide output timing pulses, an unload bit-counter means constructed to respond to the output timing pulses from said output timing source means, control means including second gating means for gating the output timing pulses from said output timing source means to said unload bit-counter means in response to a predetermined output count sequence of said load bit-counter means, a plurality of unload gating means each individual to individual ones of said shift registers and constructed to respond to particular count output signals of said unload bit-counter means and the output timing pulses from said output timing source means to unload the data bit stored in each of said shift registers in the same sequential order in which said data bits were stored and to unload said shift registers in the same predetermined order in which they were loaded, and output means including an output terminal and a third gating means responsive to the output count signals of said unload bit-counter means to supply the data bits unloaded from said shift registers to said output terminal in the same sequential order in which said data bits were unloaded.

3. A bit-rate changer in accordance with claim 2 in which said gated variable frequency input timing pulse source comprises a gated oscillator means, an "and" gate for receiving said input data words and also being connected to an output of said load bit counter means, said "and" gate being enabled by a last count of said load-bit counter means to begin passing a first bit of each received word, an "or" gate having an input connected to another output of said load-bit counter means that represents the complement of its last count, another input of said "or" gate receiving the output of said "and" gate, an output of said "or" gate connected to said gated oscillator means to enable said gated oscillator means on all counts of said counter but its last, unless data is being received, and means connecting the output of said gated oscillator means to the input of said load-bit-counter means.

4. A bit-rate changer in accordance with claim 2 in which said control means further comprises a bistable circuit having a set and a reset input, said set input being connected to said load counter means to be set at a predetermined count, said reset input of said bistable circuit being connected to an output of the unload counter means to be reset at the last count of a sequence of a cycle of said unload counter means, said second gating means being responsive to an output signal of said bistable means to become opened in response to the setting of said bistable circuit.

5. A bit-rate changer in accordance with claim 2 in which said third gating means couples the outputs of said shift registers to the output terminal of said converter, input terminals of said third gating means being connected to output terminals of said unload bit counter means to control the output levels of said converter at the beginning and end of each word.

6. A bit-rate changer in accordance with claim 5 in which said third gating means comprises a plurality of "or" gates, each having an input connected to a respective output of said shift registers, another input of the "or" gate which is connected to the last sequenced shift register being connected to said unload counter means to be blocked during its last count, and the other of said plurality of "or" gates having another input connected to said unload counter means to be blocked on all counts except its sequenced unload counts, an "and" gate having respective inputs connected to outputs of said "or" gates, another input of said "and" gate being connected to said unload counter means and being blocked on its initial count to control the output levels at the beginning and end of a word, and means connecting the output of said "and" gate to the output terminal of said converter.

7. A bit-rate changer in accordance with claim 2 in which said plurality of shift registers are two in number with the first shift register having a storage capacity of three bits and the second sequence shift register having a storage capacity of two bits.

References Cited in the file of this patent

UNITED STATES PATENTS

| | | |
|---|---|---|
| 2,872,665 | Townsend | Feb. 3, 1959 |
| 2,969,522 | Crosby | Jan. 24, 1961 |